United States Patent [19]
Martin

[11] 4,164,854
[45] Aug. 21, 1979

[54] DESALINATION METHOD WITH MERCURY REFRIGERANT

[75] Inventor: John K. Martin, Monterrey, Mexico

[73] Assignee: Fabrication de Maquinas, S.A., Monterrey, Mexico

[21] Appl. No.: 854,473

[22] Filed: Nov. 23, 1977

[51] Int. Cl.² .............................................. B01D 9/04
[52] U.S. Cl. ...................................... 62/536; 62/533; 62/123
[58] Field of Search .................. 62/536, 533, 123, 124

[56] References Cited

U.S. PATENT DOCUMENTS

| | | | |
|---|---|---|---|
| 1,905,185 | 4/1933 | Morris | 62/536 |
| 2,666,304 | 1/1954 | Ahrel | 62/536 |
| 3,069,864 | 12/1962 | Crosby | 62/541 |
| 3,233,420 | 2/1966 | Vesper | 62/539 |
| 3,367,123 | 2/1968 | Schambra | 62/533 X |

Primary Examiner—Norman Yudkoff
Attorney, Agent, or Firm—Kemon and Estabrook

[57] ABSTRACT

A salt water purification apparatus and process utilizes a vertically arranged elongated tank in which salt water is first frozen into a solid block and then melted to provide pure water. The freezing is accomplished by injecting into a column of salt water within the tank, a finely atomized spray of precooled mercury to absorb heat from the water and to initiate the formation of ice crystals in the ice column. The mercury is continuously recirculated through a cooling means and the ice crystals accumulate in the upper portion of the tank due to their inherent buoyancy when they form a solid block of ice. A heat exchanger positioned in the upper portion of the tank thaws the upper portion of the ice block by indirect heat exchange with the incoming salt water feed. The block is moved upwardly in the tank due to hydraulic pressure created below the block by the salt water feed. Fresh water can therefore, be continuously or intermittently withdrawn from the upper portion of the tank and concentrated brine and precipitated salts withdrawn from the lower portion of the tank.

3 Claims, 2 Drawing Figures

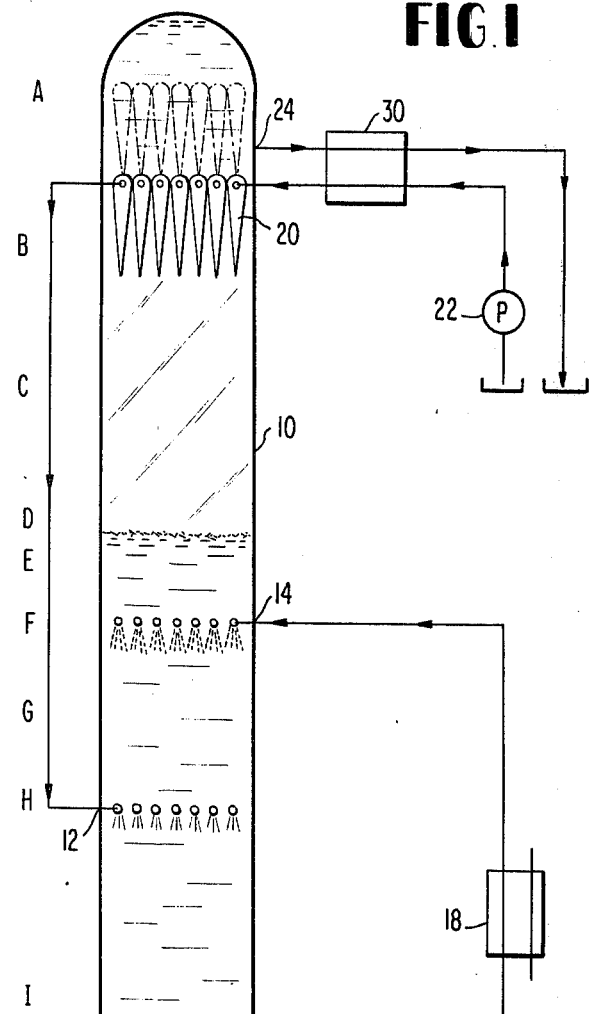
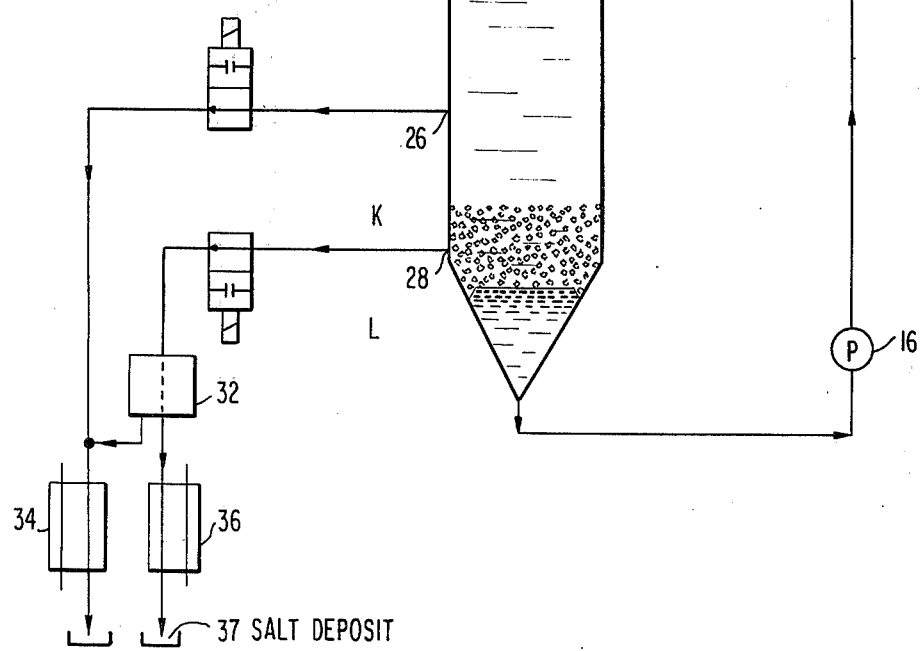

னnat
DESALINATION METHOD WITH MERCURY REFRIGERANT

BACKGROUND OF THE INVENTION

As it is well known, ice crystals formed from a saline solution are composed of pure solids while the impurities remain in the solution or are separately precipitated. If salt water is frozen under conditions of violent agitation, large numbers of very small (10 to 250 micrometer) ice crystals are formed and due to their natural buoyancy, they will collect at the top of the water. Such a mass of small crystals will tend to trap some of the salt water by capillary action between the crystals much like water soaked snow. If on the other hand, the salt water is frozen without agitation, the ice crystals grow to large solid blocks which inherently exclude all salts and foreign particles.

Previously proposed water purification processes employing a freezing cycle have experienced difficulties with the heat transfer surfaces. If an indirect heat transfer surface is located under water, it will soon be completely covered with an ice deposit which interferes with heat transfer from the cooling surface to the water and further creates a problem of harvesting of the ice. To avoid this difficulty, it has also been proposed to use a direct freezing process, for example, by bubbling a gaseous refrigerant such as Freon or butane or propane through salt water. Such refrigerants while expanding and evaporating, absorb heat from the water and produce water crystallation in the form of ice needles or platelets, which are suspended in the remaining brine and must be filtered and washed in order to harvest pure water. The difficulty with these processes is that all known gaseous refrigerants exhibit a certain degree of solubility in water and some carry-over with the water is therefore, unavoidable. Also, some refrigerants are flammable so that leaks present a fire hazard.

BRIEF SUMMARY OF THE INVENTION

In accordance with the present invention, the drawbacks to the prior purification by freezing processes are overcome by using finely atomized mercury in direct contact with the salt water as the freezing medium. In an elongated vertically arranged tank, a column of salt water is established by feeding salt water into the mid-section of the tank. Precooled finely atomized mercury is then injected directly into the salt water column, preferably at a point below the upper level thereof but above the point of injection of the salt water. The mercury droplets absorb heat from the salt water and cause the formation of ice crystals in the brine as they fall rapidly through the water column and collect in the lower portion of the tank. The mercury is then withdrawn and recirculated through an external cooler in order to again lower its temperature to a point where the freezing process in the tank will be continued. The ice crystals formed in the liquid column by the cold droplets of mercury are permitted to accumulate in the upper portion of the tank where they eventually form a solid ice block which is substantially pure. A movable heater exchanger positioned in the upper portion of the tank is arranged so that the incoming salt water feed goes through the heat exchanger and provides enough heat to melt the upper portion of the block and permit the harvest of pure water therefrom. Concentrated salt water and precipitated crystals may be withdrawn from the lower portion of the tank.

BRIEF DESCRIPTION OF THE DRAWINGS

FIG. 1 is diagrammatic illustration of a water purification apparatus in accordance with the present invention; and FIG. 2 is a diagram of the external refrigerant circuit employed in conjunction with the apparatus of FIG. 1.

DETAILED DESCRIPTION

Referring now to FIG. 1, an elongated vertically arranged tank 10 is the vessel within which the salt water is frozen and then harvested as pure water. Salt water is injected into the interior of the tank at about the mid-section thereof as indicated at 12 in order to establish a column of salt water extending a substantial distance above the level of the injection point 12. At a second level 14 which is above the level of the point 12 but below the level of the water in the tank, precooled, finely atomized mercury is injected directly into the salt water column. The mercury is collected at the bottom of the tank and then withdrawn and recirculated by pump means indicated at 16 through a heat exchanger 18 and back to the tank interior.

In the upper portion of the tank, there is a movable heat exchanger 20 and the incoming salt water is pumped through this heat exchanger by the pump 22 before it is injected into the center portion of the tank at the point 12. Pure water is removed from the upper portion of the tank at the outlet 24. In the lower portion of the tank 10, there are a pair of outlets 26 and 28 for removal of concentrated brine solution and precipitated salts, respectively.

To facilitate description of the operation of the apparatus, the tank 10 may be thought of as divided into a plurality of zones as indicated in the drawing, beginning with A at the top thereof and extending to L at the bottom thereof. Saline water from any given source is pumped through heat exchangers 30 and 20 and then into the interior of the tank through the inlet 12 located at zone H. At the same time, the heat transfer fluid (mercury) is collected at the bottom of the tank in the zone L and withdrawn and recirculated by pump 16 through the heat exchanger 18 and again injected into the upper portion of the liquid column at the zone F. The salt water with its higher heat content and lower salinity tends to rise while the heat transfer fluid (mercury) with its higher specific gravity passes rapidly downwardly through the zones G, H, I and K and accumulates in the bottom Zone L. While passing through these zones G, H, I and K, the heat transfer fluid lowers the water temperature by absorbing heat from the water. When the water temperature becomes sufficiently low, pure ice crystals begin to form in the Zones G, H and I. These crystals are buoyant and therefore, float upwardly to accumulate at the surface and then form a solid ice block in the Zone C of the tank. At the same time, when the salt water temperature is lowered, some of the salts are precipitated and fall to the bottom where they accumulate at the Zone K on top of the pool of mercury in the Zone L. The slurry of salt crystals removed from the Zone K at the outlet 28. The freezing process gradually increases the concentration of salt in the liquid column in the Zone I and the concentrated solution is removed at the outlet 26.

In the meantime, the ice accumulation in the Zone D gradually lowers the ice-water interface towards the Zone E. In order to re-establish the level of the original ice-water interface, an additional quantity of salt water is introduced by the pump 22 into a tank at the Zone H. The hydraulic pressure acting upon the lower surface area of the ice block produces an upward force which becomes highest at the junction of the tank wall. This results in a shearing force between the block of ice and the tank wall which lowers the melting point at that location and permits the block of ice to rise. The heat exchange which takes place in the exchanger 20 at the upper portion of the tank melts the upper portion of the ice block in the Zones A and B so that pure water may be withdrawn from the Zone A at the outlet 24. The upward movement of the ice block within the tank acts like a piston in a cylinder to force pure water through the outlet 24.

The precipitated salts withdrawn from the Zone K at the outlet 28 are fed to a salt and water separator 32 of any conventional type. The water from the separator 32 is combined with the salt water from the outlet 26 and passed through a heat exchanger 34. The salts slurry from the separator 32 also go through a heat exchanger 36 and then to a salt deposit indicated schematically at 37.

FIG. 2 shows the refrigerant circuit. Liquefied refrigerant is expanded through a conventional refrigerant control means such as a valve or capillary indicated at 38 into an evaporator 18 in order to cool the mercury to a sufficiently low temperature that it will produce ice crystals in the salt water column in the tank 10. From the evaporator 18, the refrigerant is compressed in compressor 40 and then circulated through heat exchangers 20, 30, 36, 41 and 34 before it is returned in liquid form to the expansion device 38. The warmest refrigerant, that is, that coming directly off the high side of the compressor, goes first to the heat exchanger 20 through which the incoming salt water feed is going and this will aid in the harvesting of the ice from the upper end of the block. From the exchanger 20, the partially cooled and liquefied refrigerant goes to heat exchanger 30 which is traversed by the harvested water as well as the incoming warm feed. From the exchanger 30, the refrigerant then goes to exchangers 36 and 34 which are traversed by the precipitated salts and the concentrated brine withdrawn from the lower portion of the tank. Intermediate these two exchangers there may be positioned the conventional condenser and/or liquid receiver 41.

The fact that the mercury is finely atomized means that there is an increased heat transfer surface presented to the salt water. By maintaining a high rate of flow of mercury in the circuit, the mercury can have a very small temperature differential with the saline solution in the tank. The fact that the mercury as a heat transfer medium is physically separated from the refrigeration cycle, permits the use of a most efficient refrigerant without regard to its water solubility. For instance, this readily permits the use of ammonia as the refrigerant in this cycle whereas ammonia would be totally unusable in those applications where there is direct contact between the refrigerant and the water. Being able therefore to utilize the most efficient refrigerant in the refrigerant side of the system, enables extremely accurate control of the temperature at which the mercury enters and leaves the tank. An ideal condition would be where the mercury and the water were both at minus 2 degrees centigrade.

The other advantage to the use of mercury as a heat transfer medium is that no crystals form around the mercury itself. The mercury simply absorbs heat from the water as it passes rapidly through the column from top to bottom and carries no ice crystals with it to the lower portion of the tank. However, if a mercury droplet should be covered with a film of ice, it will be melted when the droplet reaches the zone K where higher saline content of the solution lowers the melting point of the ice and frees the mercury droplet.

In the operation of a purification cycle in accordance with the present invention, the ice block may be either continuously elevated in the tank and simultaneously continuously melted at the upper surface thereof or the elevation and melting cycles may be intermittent. In either case, it will be understood that the pressure of the incoming saline water must be sufficiently high that the force exerted on the under surface of the ice block will create a shear stress at the ice-tank interface to lower the melting point and force the ice block upwardly in the tank.

While a preferred embodiment of the present invention has been herein shown and described, applicant claims the benefit of a full range of equivalents within the scope of the appended claims.

I claim:

1. A freezing process for obtaining pure water from salt water comprising:
   feeding salt water to a vertically arranged elongated closed tank to establish a column of salt water therein, the level of which is above the feed point;
   continuously cooling a body of mercury externally of said tank, and injecting said mercury in the form of finely atomized particles into the upper portion of said liquid column, withdrawing said mercury from the bottom of said tank and recirculating said mercury through said liquid column to maintain the column at a temperature which is subcooled with respect to the salt water infeed so that the infeed has ice crystals formed therein due to contact with the subcooled column;
   permitting the ice crystals to accumulate and form a solid block of ice in the upper portion of said tank above the level of mercury injection;
   moving said block of ice upwardly in said tank by hydraulic pressure of incoming salt water and melting the upper portion of said block of ice by indirect heat exchange with the salt water feed prior to entry of said feed into said column and withdrawing pure water from the upper portion of the tank between the top of said tank and the top of said ice block; and
   withdrawing concentrated salt water and precipitated salts collected above the mercury from the lower portion of said tank.

2. A process as defined by claim 1 in which all steps are continuously performed.

3. A process as defined in claim 1 in which all steps are intermittently performed.

* * * * *